United States Patent
Berheide et al.

(10) Patent No.: US 9,995,841 B2
(45) Date of Patent: Jun. 12, 2018

(54) COMPACT SCINTILLATION DETECTOR

(71) Applicant: SCHLUMBERBER TECHNOLOGY CORPORATION, Sugar Land, TX (US)

(72) Inventors: Markus Berheide, Cambridge, MA (US); Wolfgang Ziegler, Hightstown, NJ (US); Timothy Spillane, Quincy, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days. days.

(21) Appl. No.: 15/188,549

(22) Filed: Jun. 21, 2016

(65) Prior Publication Data

US 2017/0363768 A1 Dec. 21, 2017

(51) Int. Cl.
*G01V 5/10* (2006.01)
*G01T 1/20* (2006.01)

(52) U.S. Cl.
CPC ............ *G01V 5/101* (2013.01); *G01T 1/2018* (2013.01)

(58) Field of Classification Search
CPC ............... G01V 5/04; G01V 5/12; G01T 1/20
See application file for complete search history.

(56) References Cited

U.S. PATENT DOCUMENTS

| | | | | |
|---|---|---|---|---|
| 4,507,733 A * | 3/1985 | Blum | ..................... | G01T 1/1642 250/363.09 |
| 4,638,164 A * | 1/1987 | Sonne | ..................... | G01T 1/202 250/256 |
| 5,180,916 A * | 1/1993 | Lehtinen | ................. | G01T 1/204 250/367 |
| 5,190,857 A * | 3/1993 | Allen | ................. | G01N 21/6428 250/459.1 |
| 5,610,967 A * | 3/1997 | Moorman | ................. | A61B 6/06 378/141 |
| 8,294,887 B1 * | 10/2012 | Biellak | ............. | G01N 21/9501 356/237.1 |
| 2004/0179645 A1* | 9/2004 | Hoffman | ................ | A61B 6/032 378/19 |
| 2005/0127300 A1* | 6/2005 | Bordynuik | ................ | G01T 3/06 250/361 R |
| 2005/0268692 A1* | 12/2005 | Delvigne | .............. | G01F 1/7042 73/23.31 |

(Continued)

OTHER PUBLICATIONS

Orito et al., "New proximity focusing photomultiplier resistant to high magnetic field," 1983, Nuclear Instruments and Methods in Physics Research, vol. 216, Issue 3, Abstract only.*

*Primary Examiner* — Kiho Kim

(57) ABSTRACT

Devices may include a scintillation detection device including a scintillator, a photon detector at least partially enclosed by the scintillator, and at least one reflector at least partially enclosing the scintillator. In another aspect, an oilfield wellbore device may include an oilfield string with at least one scintillation detection device on the string and a pressure housing enclosing the one or more scintillation detection devices. In another aspect, a method of measuring radiation in an oil and gas well may include conveying at least one scintillation detection device to at least one zone of interest in the oil and gas well and recording data from at least one scintillation detection device as a function of location in the well.

20 Claims, 7 Drawing Sheets

(56) References Cited

U.S. PATENT DOCUMENTS

| | | | |
|---|---|---|---|
| 2008/0061244 A1* | 3/2008 | Adamec | H01J 37/244 |
| | | | 250/368 |
| 2009/0266992 A1* | 10/2009 | Beekman | G01T 1/2002 |
| | | | 250/370.09 |
| 2011/0282818 A1* | 11/2011 | Chen | G01V 5/125 |
| | | | 706/21 |
| 2012/0228472 A1* | 9/2012 | Simonetti | G01T 1/202 |
| | | | 250/207 |
| 2012/0312994 A1* | 12/2012 | Nikitin | G01T 1/2002 |
| | | | 250/362 |
| 2015/0014544 A1 | 1/2015 | Stephenson et al. | |

* cited by examiner

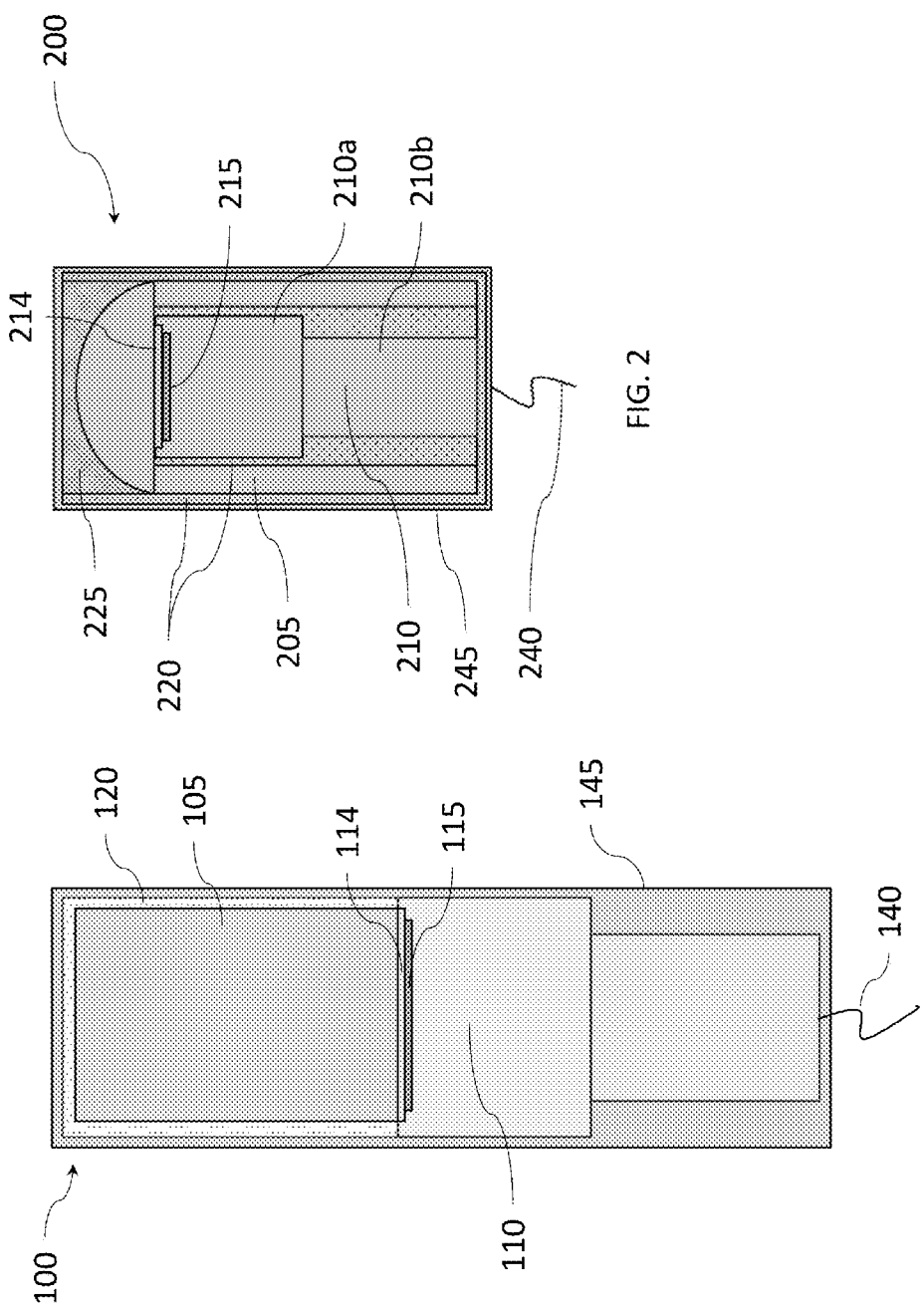

COMPACT SCINTILLATION DETECTOR

BACKGROUND

Multiple devices have been proposed and implemented to detect radiation. These devices are commonly referred to as radiation detectors. One type of radiation detector, known as a scintillation detector, uses a scintillator to convert impinging radiation into one or more photons of light. These photons are then detected by a photon detector.

In the oilfield industry, radiation detectors are used in a variety of capacities, including but not limited to safety monitoring, flow metering, and well logging. Well logging may be performed using such means of conveyance as, for example, logging while drilling (LWD) or wireline. Gamma ray detectors are used in the oilfield for example for natural gamma ray measurements, for density measurements, and for neutron-induced gamma ray measurements such as capture spectroscopy and inelastic spectroscopy. Neutron detectors are commonly used to measure fast neutrons (such as flux monitors) or scattered neutrons. The latter are typically used to derive formation properties such as neutron porosity or hydrogen index.

SUMMARY

This summary is provided to introduce a selection of concepts that are described further in the detailed description below. This summary is not intended to identify key or essential features of the claimed subject matter, nor is it intended to be used as an aid in limiting the scope of the claimed subject matter.

In one aspect, a device in accordance with the present disclosure may include a scintillator, a photon detector at least partially enclosed by the scintillator, and at least one reflector at least partially enclosing the scintillator and configured to direct photons emitted by the scintillator to the photon detector.

In another aspect, an oilfield wellbore device in accordance with the present disclosure may include an oilfield string with at least one scintillation detection device on the oilfield string and a pressure housing enclosing the one or more scintillation detection devices. The scintillation detection device may include a scintillator, a photon detector at least partially enclosed by the scintillator, and at least one reflector at least partially enclosing the scintillator.

In another aspect, a method in accordance with the present disclosure of measuring radiation in an oil and gas well may include conveying at least one scintillation detection device having a photon detector at least partially enclosed by a scintillator to at least one zone of interest in the oil and gas well and recording data from the at least one scintillation detection device as a function of location in the oil and gas well.

Other aspects and advantages of the disclosure will be apparent from the following description and the appended claims.

BRIEF DESCRIPTION OF DRAWINGS

FIG. 1 is a schematic of a conventional scintillation detector design.

FIG. 2 is a schematic showing one embodiment of the present disclosure featuring an "integrating sphere" reflector facing the photocathode of the photomultiplier tube (PMT).

DETAILED DESCRIPTION

Figure 3:
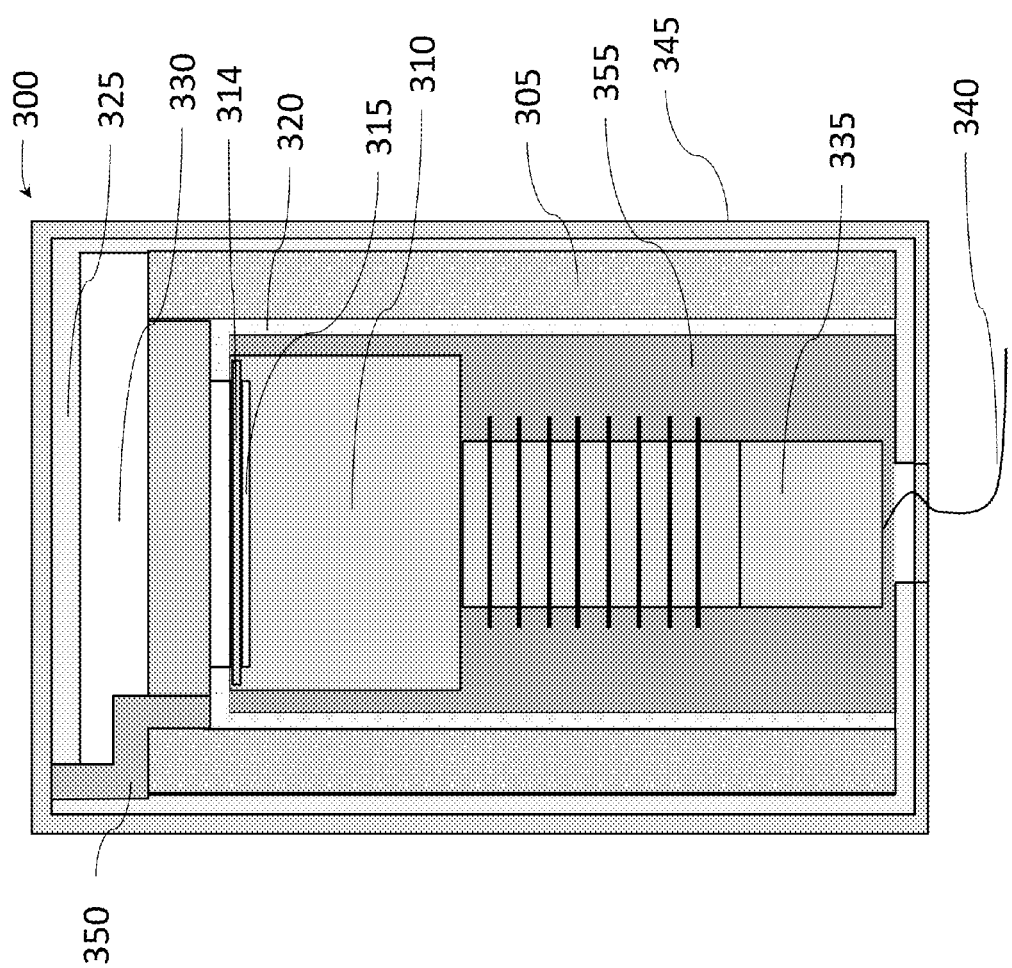
FIG. 3 is a schematic showing one embodiment of the present disclosure with a PMT faceplate and photocathode recessed with respect to the end of the scintillator tube.

The following is directed to various exemplary embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. Further, like reference numbers and designations in the various drawings indicate like elements.

Certain terms are used throughout the following description and claims to refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis.

The present disclosure is of a device referred to as a compact scintillation detector. A general discussion of scintillation detectors follows. By compact, it is meant that this scintillation detector occupies less space than one of comparable performance in detecting the specific radiation to which it was designed to be sensitive. As used herein, the term "scintillation detector" refers to the a device incorporating both a scintillator (made of a scintillator material) and a photon detector, while the term "scintillator" or "scintillator material" refers to the component or material within the scintillation detector that exhibits scintillation. Some scintillator materials are self-activated, for example bismuth germanate (BGO). In others, the optically active material, the "activator", may be a "dopant" (e.g., cerium) in the scintillator "host" or "matrix" material (e.g., an oxide). The dopant is typically substitutional, meaning that the dopant has been substituted for an equal amount of another ion in the crystal structure. In the naming of the material, the host material name is usually abbreviated (e.g., GSO for gadolinium oxyorthosilicate) and the activator (if applicable) is indicated in brackets or separated by a colon. Occasionally, in the literature and datasheets for common scintillator materials the activator dopant may also be understood and not explicitly mentioned (e.g., GSO instead of GSO:Ce or Ce:GSO). Equally, if a chemical formula is given it may not explicitly show the dopant, but just the formula of the host material.

A scintillator may be composed of a large variety of materials. The phase of the scintillator material may be solid, liquid, or gas. In particular embodiments, the scintillator material may be a solid, particularly for embodiments used in oilfield instrumentation. Solid scintillators may have different morphologies. That is, a scintillator material could be a crystal, a poly-crystal, a ceramic, a glass, a plastic, a eutectic, or a composite material (such as micro-crystal in a silicone rubber). The scintillator materials can be inorganic or organic. The shape of the scintillator is often cylindrical, but many other shapes are used. Some scintillator materials are chemically reactive therefore protected. For example, a scintillator material for gamma radiation detection is thallium-activated sodium iodide (NaI(Tl)), which is chemically very reactive and may be used with a protective housing. The protective housing features at least one window that lets light escape from the housing. The window adds interfaces to the light path and may reduce light transmission. A scintillator material for gamma radiation that can be used without a protective housing (and the associated window) is, for example, cerium-activated yttrium aluminum perovskite (YAP). Scintillators for neutrons are often based on lithium-6 enriched compounds, and examples may include cerium-activated lithium glass and cerium-activated or europium activated lithium calcium aluminum fluoride (LiCAF).

When ionizing radiation interacts with a scintillator material, the scintillator absorbs the energy of the radiation and re-emits the energy in the form of light. For the most common scintillator materials, the emitted light is in the visible or near-UV part of the spectrum. The scintillator may be coupled to a photon detector to detect the photons of light emitted by the scintillator. Examples of photon detectors include photomultiplier tubes (PMT) as often called in the art and a variety of solid-state photon detectors. Solid-state photon detectors include avalanche photodiodes (APD) and silicon photomultipliers (SiPM), and their use in embodiments of the present disclosure may depend, for example, on the expected end-use operating temperature and the stability of the detector. Photomultiplier tubes have a photosensitive layer, called a photocathode, which emits an electron on photon impact, and an electron multiplier stage, which converts the single electron into a measurable electronic signal. The photocathode may be placed on the evacuated inside of the PMT to allow the electrons to escape easily and be accelerated towards the first dynode. In addition, the vacuum helps to protect the photocathode which tends to be made out of very reactive (e.g. alkali) elements. In modern photomultiplier tubes the photocathode is usually a thin film deposited onto a transparent substrate which is called here a faceplate. This faceplate is part of a window which is part of the vacuum envelope of the PMT (the inside of the PMT is under high vacuum to allow for efficient electron transport and acceleration) and serves the function of allowing light to enter the PMT and impinge on the photocathode. PMTs are often substantially cylindrical, and they exist in two common varieties: "end-on" and "side-on." In the end-on PMT, the faceplate with the photocathode is placed on the flat end of the cylinder as shown in, for example, FIG. 1, while the side-on PMT, conventionally comprising a tubular glass body, has the photocathode situated along part or all of the side of the cylinder as seen in, for example, FIG. 4.

A conventional scintillation detector 100, as shown in, for example, FIG. 1, includes a cylindrical scintillator 105 with a photomultiplier 110 coupled to one end of the cylinder of scintillator material 105. In this case the photomultiplier 110 is typically an end-on design and the faceplate 114 and photocathode 115 is typically chosen big enough to cover most of the surface of the cylinder flat of the scintillator crystal 105 to avoid light losses between the scintillator crystal 105 and the photocathode 115. A reflector 120 surrounds the surfaces of the scintillator crystal 105 that are not optically coupled to the PMT 110. A housing 145 provides mechanical and chemical protection for the components of the detector 100. Wiring 140 supplies power to the PMT 110 as well as a way for the PMT 110 to communicate with external devices. A disadvantage of this conventional scintillation detector is the additional length added by the photon detector which adds dead space, i.e., space where the radiation of interest cannot be detected or auxiliary parts such as radiation shielding cannot be placed. This is particularly troublesome when multiple neutron detectors have to be placed in close proximity. However, as discussed below, example embodiments of the present disclosure provide for a compact scintillation device, removing or reducing such dead space and allowing for multiple detectors to be placed in close proximity to one another.

While one or more embodiments of the present disclosure are directed toward oil and gas exploration applications, one possessing reasonable skill in the art will recognize that application also may be made to other endeavors where radiation detection is performed.

In one or more embodiments of the present disclosure, a compact scintillation detector may comprise a scintillator with its interior partially or entirely removed and a photon detector disposed partially, substantially, or entirely inside the scintillator. For example, in various embodiments, including those discussed below, at least about 25%, 50%, 75%, or 100% of a length of the photon detector overlaps a length of the scintillator. One of reasonable skill in the art will understand that the scintillator may be composed of any material that converts one or more forms of radiation impinging upon it into light. These scintillation materials include but are not limited to those disclosed above. Further, one of reasonable skill in the art will understand that a photon detector is any device that converts photons into a measureable signal. Photon detectors include but are not limited to photomultiplier tubes (PMTs) and solid-state photon detectors such as those disclosed above. For purposes of this disclosure, PMTs are understood to represent and be interchangeable with the broader category of photon detectors.

For simplicity, the embodiments below are described with solid scintillator tubes and cylindrical PMTs. A scintillator tube is scintillator material in the approximate shape of a tube, possessing an inner diameter, an outer diameter, and a length. The difference between the radius of the inner and outer diameters is often referred to as the wall thickness. However, the exact cross-sectional shape is not a limitation and some scintillator materials may be formed in more complex shapes that, for example, enhance the transmission of light from the scintillator to the photon detector. One of reasonable skill in the art will recognize that other geometries, for example, cups, are also covered by the present disclosure as are other material properties such as plastics and composites that may be somewhat flexible.

In the embodiment of the present disclosure shown in FIG. 2, an arrangement of reflectors is used to guide the light from the scintillator onto the photocathode, based on the principle of an integrating sphere at one end of the scintillator tube. More detail about integrating spheres is given below. In this embodiment, the scintillation device 200 includes a PMT 210 disposed substantially inside the scintillator tube 205. The PMT 210 includes a faceplate 214, a photocathode 215 deposited on the faceplate, a focusing stage 210a, and a multiplier stage 210b.

In the non-limiting example of FIG. 2, the PMT 210 (which includes faceplate 214, photocathode 215, focusing stage 210a, and multiplier stage 210b) is fully disposed within the interior volume of reflector 220, which is bounded by the interior surface of the annular cylinder of the scintillator 205. Although the scintillator 205 of FIG. 2 is a single monolithic piece, it should be understood that in other examples, the scintillator may be formed of multiple pieces in direct contact or spaced apart from each other. The scintillator may be any suitable shape. Moreover, in other examples, a portion of the PMT 210 may be disposed outside of the interior volume of the scintillator 205. In some examples, 30% or more of the PMT 210 is disposed in the interior volume of the scintillator 205. In some examples, 50% or more of the PMT 210 is disposed in the interior volume of the scintillator 205. In some examples, 75% or more of the PMT 210 is disposed in the interior volume of the scintillator 205. In examples where the scintillator is not a hollow tube, the interior volume may be, for example, the volume of a recess defined by the scintillator, or a space disposed directly between two surfaces of the scintillator.

The type of PMT 210 illustrated in FIG. 2 is referred to as an end-on PMT since the photocathode 215 is located on the flat end surface of the substantially cylindrical PMT 210. The diameter of the PMT 210 may range between 1% and 99% of the inner diameter of the scintillator tube 205, or with a lower limit of any of 1, 5, 10, 20, 40, or 50% and an upper limit of any of 50, 60, 80, 90, 95, or 99%, where any lower limit can be used in combination with any upper limit. A conventional scintillation detector design tends to use a photocathode of the same diameter as the diameter of the coupling surface of the scintillator crystal to avoid light losses between the scintillator and the PMT (the faceplate is commonly a little larger than both). In example embodiments of the present disclosure, a PMT with a smaller photocathode can be used to capture photons from a scintillator material of the same outer dimensions as the conventional scintillator crystal. A smaller diameter photocathode allows the PMT to be smaller not just in diameter but overall. In particular, for the type of PMTs used in the oilfield, the length of the PMT tends to increase as its diameter increases. Thus the overall length of the PMT can be reduced as well as the diameter. This leaves additional design room to optimize the other detector components (for example, the reflectors). Thus, small detector sizes can be achieved that are unachievable with conventional designs. Reflector(s) 220 are disposed outside the outer surface of scintillator tube 205 and also between the inner surface of the scintillator tube 205 and the cylindrical surface of the PMT 210. A reflector cup is another kind of reflector that has a substantially concave shape. A reflector cup may be constructed in multiple ways, including, for example, machining a substantially concave surface out of reflective material or by covering a substantially concave shape with a reflective material. One type of reflector cup substantially functioning as an integrating sphere 225 is disposed at the photocathode 215 end of the PMT 210. An integrating-sphere (also known as an Ulbricht sphere) is not necessarily a geometrically spherical shape, and the reflector cup may approximate the function of an integrating sphere. With an integrating sphere, light from a light source enters the sphere through a relatively small opening, or port, and a detector evaluates the intensity of the light in the sphere through another small opening. The sphere may be made of highly reflective material with the reflectance being diffuse and not specular. The integrating sphere principle is widely used to measure luminescence intensity for commercial light sources (for example, luminaires and LEDs). This same principle, in general form, may be applied to one or more embodiments of the present disclosure. The integrating sphere 225 is oriented such that its concave surface is facing both the PMT 210 and the scintillator tube 205 and the radius of curvature of its concave surface is approximately one-half that of the outer diameter of the scintillator tube 205, or may range from, for example, one-quarter to three-quarters that of the outer diameter. One of ordinary skill in the art will recognize that the shape of the concave surface of the integrating sphere 225 may be optimized experimentally or with ray tracing techniques, embracing a compromise between the length added due to the reflector and its effectiveness. A housing 245 encloses the components of the device 200. Wiring 240 provides the PMT 210 with power and communication with external devices. Note that in the embodiment of FIG. 2, the faceplate 214 carrying the photocathode 215 is substantially flush with the end of the scintillator tube 205. In other examples, a non-flush configuration is provided.

Figure 8:
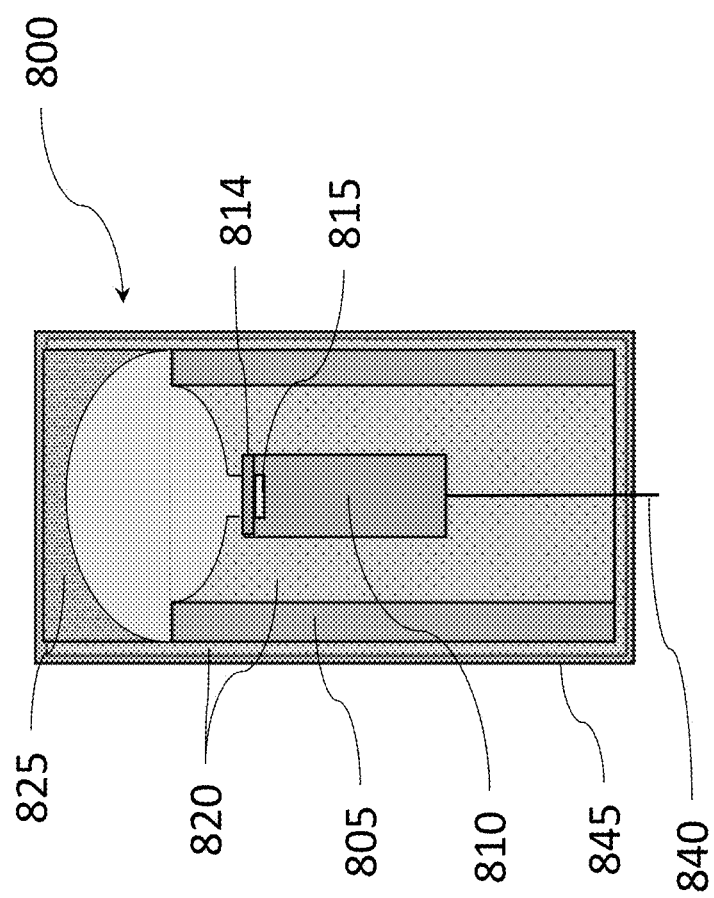
FIG. 8 is a schematic of one embodiment of the present disclosure applying the "integrating sphere" principle to the reflectors.

Another embodiment of the present disclosure using the principle of an integrating sphere is shown in FIG. 8. In this embodiment of the compact scintillation detector 800, a PMT 810, comprising a photocathode 815 deposited on faceplate 814, is disposed within a scintillator tube 805. Reflectors 820 are disposed near or on the surfaces of the scintillator tube 805 that are not optically coupled to the PMT 810. Reflector cup 825 has a substantially concave surface facing both the scintillator tube 805 and the photocathode 815. Reflectors 820 and reflector cup 825 may be shaped to apply the integrating sphere principle. Housing 845 encloses the components of detector 800 and wiring 840 provides the PMT 810 with power and communication with external devices.

The PMT 810 may be a proximity-focusing PMT, which is much more compact then a conventional PMT and allows for simpler operation. Proximity-focusing PMTs have not typically been used in applications requiring shock and temperature ruggedization, or where the scintillator and PMT were in a common housing with a diameter determined by the diameter of the scintillator. (In conventional PMTs, because the photocathode needs to be as large as possible, its diameter will be similar to that of the scintillator). Rugged PMTs are typically designed with either an electron multiplier stage known to one of reasonable skill in the art as a venetian blind multiplier or some other rugged dynode structures covering only a fraction of the PMTs photocathode diameter. This arrangement requires electrostatic focusing onto the dynodes. However, in example embodiments of present disclosure, the diameter of the PMT 810 is only limited by the inner diameter of the scintillator tube 805. The present inventors have found that a very small photocathode 815 area (for example, a photocathode may have a diameter that is approximately 12% of the full scintillator 805 outer diameter) is sufficient to collect a substantial amount of the light from the scintillator 805, as long as the "inactive" surface of the PMT faceplate 814 is reflectorized, for example, by reflector 820. This inactive surface is the portion of the faceplate 814 that is not covered by a photocathode 815 and that therefore is incapable of converting a photon to an electron. Thus, a proximity-focusing PMT is possible in the embodiments of the present disclosure, which allows for a much shorter PMT and simpler operation. One of ordinary skill in the art will recognize that 12% is not a limitation and that even smaller photocathode areas are possible, while other examples may provide diameters in excess of the aforementioned 12%.

In one or more embodiments of the present disclosure, a solid-state photon detector with a small surface may be used in combination with an "integrating sphere." An advantage of such embodiments applied to low temperature detection is that a ring-shaped array of small area detectors or one large area detector, which both are very noisy, is not required. Rather, a small solid-state photon detector in one port of the "integrating sphere" will be sufficient. One of ordinary skill in the art will understand that a solid-state photon detector could be substituted in FIG. 8 for the PMT 810, or in other examples described herein.

One advantage of the present disclosure is the reduced length of the assembled detector over a conventional scintillation detector design as design space for a detector is often very valuable. For example in an oil well logging tool, a longer detector typically requires a longer pressure housing which is more costly. In some examples, the size of the scintillation detector in a handheld device is a major factor in the overall size of the instrument.

FIGS. 1 and 2 provide a size comparison between a conventional scintillation detector design 100 (FIG. 1) and one embodiment of the present disclosure (FIG. 2). While the scintillator 205 of the present detector and the scintillator 105 of the conventional detector design have substantially the same length, the photocathode 215 of the example of the present disclosure is smaller in diameter than the photocathode 115 of the traditional detector, also reducing the footprint of the PMT between the two designs. The smaller photocathode 215 also reduces the amount of dark current produced. Dark current is noise generated by the photocathode emitting random, thermal energy electrons. This current increases as the temperature or size of the photocathode increases.

Another embodiment of the present disclosure is shown in FIG. 3. A scintillation detector 300 may include a scintillator tube 305 and a PMT 310 disposed within the tube-shaped scintillator 305. Radiation impinging upon the scintillator tube 305 will generate light that can be detected by the PMT 310. The PMT 310 comprises a photocathode 315, which converts the light into an electrical signal that can be measured. As shown, photocathode 315 is located on an axial end of the PMT 310, and thus PMT may be referred to as an end-on PMT. However, the axial end of the PMT 310 (and thus faceplate 314 with phothocathode 315) is recessed below the axial end of the scintillator tube 305. To increase the amount of this light that is detected by the PMT 310, reflectors are provided on one or more surfaces within scintillation device 300. An outer reflector 325 is disposed on or near the outer surface of the scintillator tube 305. In addition, the outer reflector 325 may be disposed on or near the outer surface of any optical coupling device used to convey light from the scintillator tube 305 to the photocathode 315, for example, the light guide 330. An inner reflector 320 is disposed on or near the inner surface of the scintillator tube 305, such as between the scintillator tube 305 and the PMT 310. These reflectors are intended to keep light generated in the scintillator 305 from exiting the scintillator without being detected by the photon detector 310. In this example, the reflectors 320 and 325 completely enclose the scintillator tube 305 except for a cutout for the photocathode 315 (on faceplate 314) and a small cutout for the wiring 340. One of ordinary skill in the art will recognize that it may be possible to construct a single reflector to serve as both an inner and outer reflector. Reflectors may be made of materials that produce diffuse or specular reflection. Such materials include but are not limited to polytetrafluoroethylene (PTFE). Reflector materials may be in the form of tape or may be machined or otherwise shaped as may be advantageous to improve the efficiency of light gathering of the compact scintillation detector 300. The reflectors may be used on or near any surface of the scintillator 305 that is not optically coupled directly or indirectly with the photon detector 310. Optical coupling is understood to be any coupling that enables the transfer of light. One skilled in the art will recognize that reflectors may extend to other areas for reasons of, for example, ease of construction or structural support. A light guide or air gap 330 is used to optically couple the scintillator tube 305 to the photocathode 315 of the PMT 310. In some embodiments, a light guide may have a refractive index matched to the scintillator 305 and the faceplate 314 of the photomultiplier tube 310. One of ordinary skill in the art will recognize that an optical coupling may be used in any of the described embodiments and may also include optical grease and optical coupling pads at any point in the optical path between the scintillator tube 305 and the photocathode 315. Optical coupling may be used to make light collection more efficient due to a reduction in the index of refraction mismatch between the scintillator 305 and the photon detector 310. Also, one of ordinary skill in the art will recognize that one may apply an anti-reflective coating to the emitting surface of the scintillator 305. The emitting surface of the scintillator 305 is understood to be that surface which is coupled either directly or indirectly to the photon detector 310. The outside of the faceplate 314 may also be covered with an anti-reflective coating. A housing 345, potting material 355 and an optional mechanical support 350 are used to mechanically secure the components. Wiring 340 supplies the PMT 310 with power and provides a way to transmit information and signals to and from the PMT 310. In the embodiment of FIG. 3, the faceplate 314 with photocathode 315 is recessed within the scintillator tube 305. When the photocathode 315 is recessed, it may be advantageous for the inner reflector 320 to be applied to only part of the inner wall of the scintillator tube 305.

In some embodiments, the outer reflector covers at least 3π (out of a maximum of 4π) steradians with respect to a point near the center of the photocathode, which is substantially enclosed by the scintillator tube.

Figure 4:
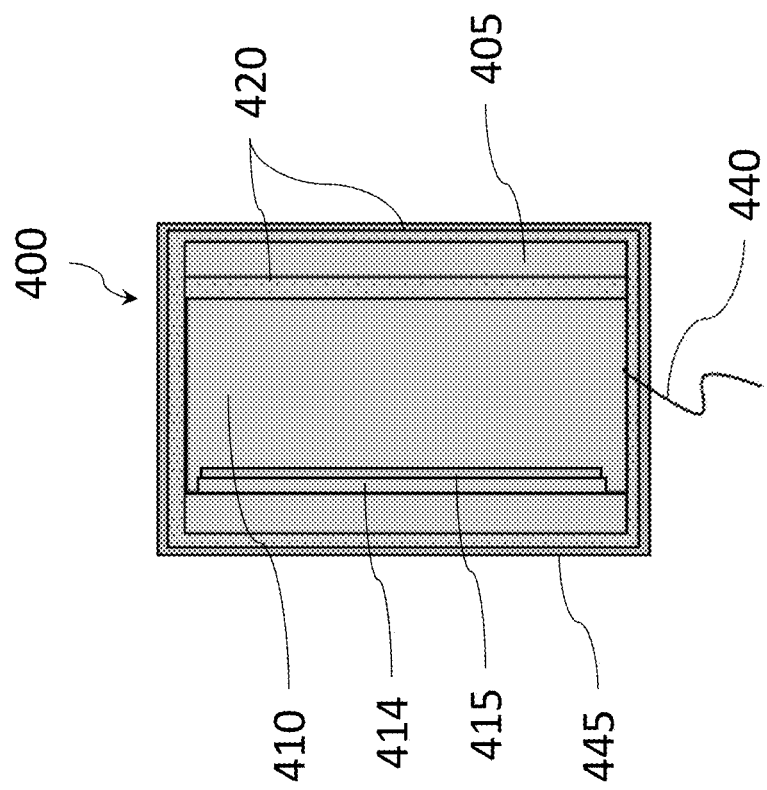
FIG. 4 is a schematic of one embodiment of the present disclosure using a side-on PMT.

FIG. 4 discloses another embodiment of the present disclosure. In this compact scintillation detector 400, the photocathode 415 is on a curved faceplate 414 of the cylindrical or radial side of the PMT 410 and coupled to the inner surface of the scintillator tube 405. This type of PMT is often referred to as a side-on PMT. Reflectors 420 enclose the scintillator tube 405 and are also disposed between the scintillator tube 405 and the PMT 410 except where the photocathode 415 is located. Wiring 440 provides power to and communication with the PMT 410. An optional housing 445 is also shown. The housing 445 provides mechanical and chemical protection to the components of the detector 400 to prevent damage from shock and vibration or foreign materials. A variation of this embodiment applies the photocathode 415 directly onto the scintillator tube 405 and without the intermediary faceplate 414, such as in US Pub. 2015/0014544, which is assigned to the present assignee and herein incorporated by reference in its entirety. In this case part or all of the scintillator is inside the vacuum enclosure of the PMT, thus replacing the tubular glass body of a conventional PMT with scintillator material.

Figures 5A, 5B:
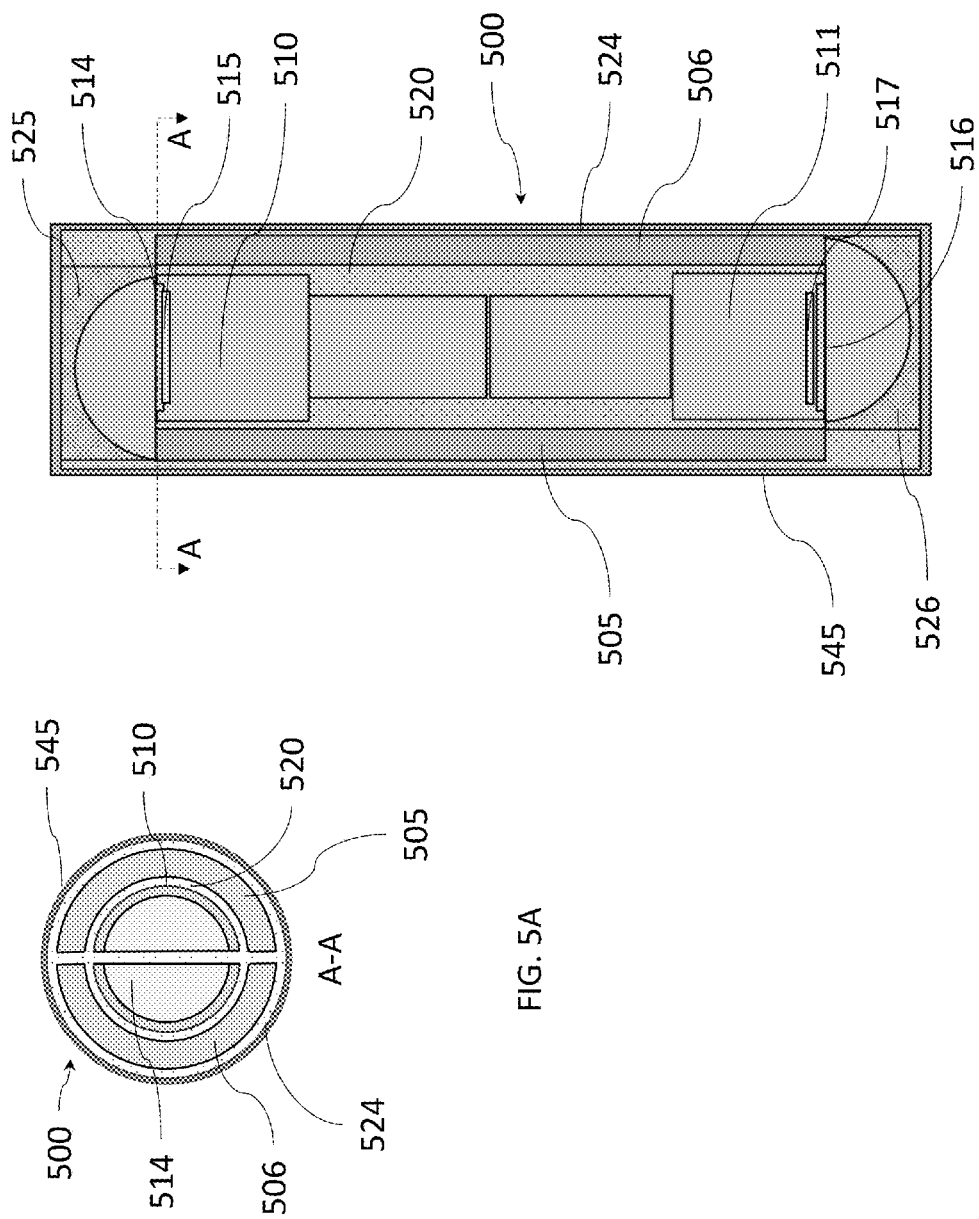
FIGS. 5A-B are schematic of one embodiment of the present disclosure where the scintillator material consists of two segments (half shells), and two PMTs are enclosed in the space between the segments, and each PMT reads out one of the segments.

FIGS. 5A and 5B present an embodiment of the present disclosure comprising a combination 500 of two compact scintillation detectors in close proximity. FIG. 5A shows the A-A cross section of the combination 500. The location of line A-A can be seen in FIG. 5B. One detector comprises a half-shell scintillator tube 505 coupled to a PMT 510 with a photocathode 515 via an integrating sphere 525, with the surfaces of the scintillator 505 that are not in optical communication with the PMT 510 surrounded by outer reflector 524 and inner reflector 520, which runs the entire length of the scintillator tube 505 in the illustrated example. The other detector comprises a half-shell scintillator tube 506 coupled to a PMT 511 with a photocathode 516 via an integrating sphere 526, with the surfaces of the scintillator 506 that are not in optical communication with the PMT 511 surrounded by outer reflector 524 and inner reflector 520, which runs the entire length of the scintillator tube 506 in the illustrated example. Two PMTs 510 and 511 are back to back with their photocathodes 515 and 516, respectively, facing in opposite directions. The scintillators are essentially half-shell scintillator tubes 505 and 506, each subtending an angle of approximately 180 degrees. Half-shell scintillator tubes 505 and 506 are positioned such that their concave inner diameter surfaces are facing each other. PMTs 510, 511 are within the interior space defined by the inner diameter of the half-shell scintillator tubes 505, 506. Outer reflector 524 is disposed around the outer surface of both scintillator tubes 505 and 506. Inner reflector 520 is disposed between the cylindrical surfaces of the PMTs 510 and 511 and the inner surfaces of the scintillator tubes 505 and 506. One integrating sphere reflector 525 optically couples half-shell scintillator tube 506 to photocathode 515 of PMT 510 while integrating sphere reflector 526 optically couples half-shell scintillator tube 505 to faceplate 516 with photocathode 517 of PMT 511. Thus, integrating sphere reflectors 525, 526 are laterally offset from one another, by an amount that is substantially equal to the thickness of each of scintillator tubes 505, 506. Housing 545 provides mechanical and chemical protection for the components of the detector 500.

This embodiment could be used in such endeavors as oil well logging where one scintillator would detect radiation from the borehole while the other scintillator would detect radiation from the formation. Further, other applications are also envisioned.

Figure 6:
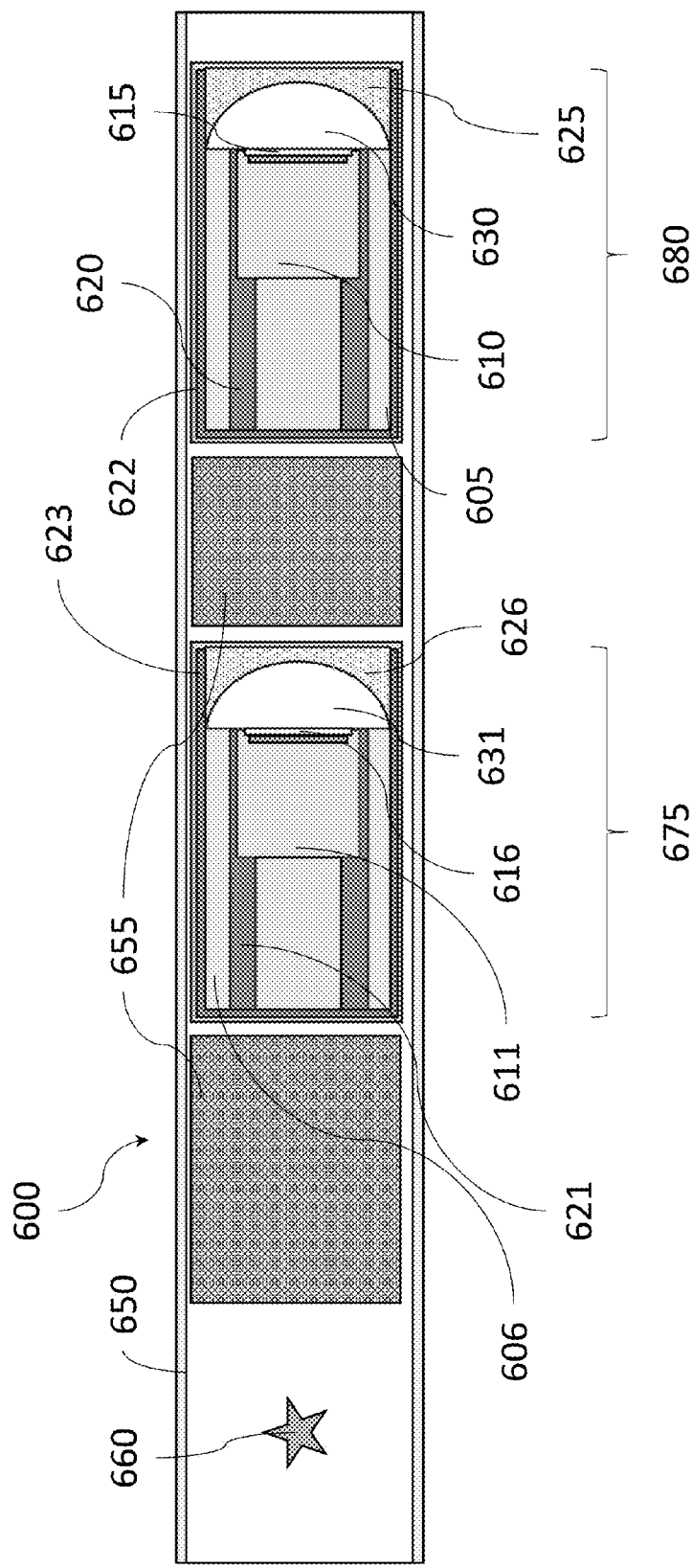
FIG. 6 is a schematic of one embodiment of the present disclosure of two compact scintillation detectors in an oil well logging neutron tool.

FIG. 6 presents another embodiment of the present disclosure for application in a neutron well logging tool in an oil or gas well. The figure reveals two compact scintillation detectors 675 and 680 (each being similar to the one disclosed in FIG. 2) that are axially spaced from one another and similarly oriented. These scintillators are sensitive to neutron radiation and are referred to as neutron scintillators, but may also be used with gamma ray sources and detection (using an appropriate scintillator material that is sensitive to gamma rays). Compact scintillation detector 675 includes a scintillator tube 606, a PMT 611 with a photocathode 616, an inner reflector 621, an outer reflector 623, a reflector cup 626, and a light guide or air gap 631. Compact scintillation detector 680 includes a scintillator tube 605, a PMT 610 with a photocathode 615, an inner reflector 620, an outer reflector 622, a reflector cup 625 and a light guide or air gap 630. A neutron source 660 emits neutrons. Radiation shielding 655 present between neutron source 660 and detector 675 and between detector 675 and detector 680 prevents neutrons emitted by the source 660 from interacting with the compact scintillation detectors 675 and 680 without first being scattered by such nuclei in the environment of the tool as those found in the formation and the borehole fluids. The entire instrumentation is enclosed within a pressure housing 650. This compact scintillator detector design increases the efficiency per unit volume. In this example of neutron well logging, a scintillator tube 605, 606 comprising a Lithium-6 enriched material will efficiently stop thermal neutrons with a wall thickness of only 2-3 mm. An advantage of this embodiment is that a compact scintillation detector of the design according to the present disclosure can be brought in very close proximity to other detectors (or to radiation shielding) as the 'dead space' incurred by a conventional scintillation detector design is much reduced. In this regard, a number of the detectors according to the present disclosure can be stacked almost seamlessly with allowing for just enough space for wiring and a short reflector on the PMT photocathode side.

An additional aspect of Lithium-6 enriched glass is that it can be shaped and cast by methods common to glass manufacturing. It is therefore possible to physically attach a glass light guide to a glass scintillator. One of reasonable skill in the art will recognize that plastics and composite materials can also be cast in shapes and similarly incorporate both scintillator and light guide in a single component.

In one or more embodiments of the present disclosure, the neutron scintillator is configured to stop more than 90% thermal neutrons. In one or more embodiments of the present disclosure, the neutron scintillator is comprised of Lithium-glass. In one or more embodiments of the present disclosure, the neutron scintillator is comprised of Lithium Calcium Aluminum Fluoride (LiCAF). In one or more embodiments of the present disclosure, the neutron scintillator is comprised of LiCAF in a silicone rubber matrix. It should be understood, however, that any other suitable material(s) may be used for the neutron scintillator material.

Where previous embodiments have been discussed in terms of scintillation detectors for neutron detection, it is also clear that many of these embodiments are also advantageous for gamma ray detectors. In one embodiment, a PMT is substantially enclosed in a scintillator sensitive to gamma rays, also called a gamma ray scintillator. In one or more embodiments of the present disclosure the gamma ray scintillator is in a crystalline phase. In one or more embodiments of the present disclosure, the gamma ray scintillator material is a Ce-doped YAP crystal. It should be understood, however, that any other suitable material(s) may be used for the gamma ray scintillator material.

In one or more embodiments of the present disclosure, the compact scintillation detector is included in an oilfield string, which may be conveyed into a wellbore in order to take measurements. Oilfield strings may include, for example, drill strings where detectors may be deployed in logging-while-drilling (LWD) operations. Oilfield strings may also include wireline tool strings. In one or more embodiments of the present disclosure, the compact scintillation detector is optimized for applications in oilwell logging. For example, in one or more embodiments of the present disclosure, the compact scintillation detector is optimized for neutron detection in a neutron porosity tool. In one or more embodiments of the present disclosure, the compact scintillation detector is optimized for detection of gamma ray in a natural gamma ray measurement. In one or more embodiments of the present disclosure, the compact scintillation detector is optimized for detection of gamma ray in a density-porosity measurement. In one or more embodiments of the present disclosure, the compact scintillation detector is optimized for detection of X-ray in a density or imaging measurement. In these various embodiments, the measurements may be recorded as a function of the location within the wellbore, and the data may be conveyed to the surface for interpretation and analysis.

EXAMPLE

An experimental embodiment configured in accordance with FIG. 2 was conducted using a commercial lithium-6 enriched Li-glass tube with a length of 3 inches, an inner diameter of about 0.72 inches, and an outer diameter of about 0.91 inches (available from Appscintech LTD and Nucsafe Corp.), a commercial photomultiplier (R1635, available from Hamamatsu Inc.), a commercial photomultiplier base (available from Hamamatsu Inc.), reflectors made of polytetrafluoroethylene (PTFE) gasket tape (available from Gore), a diffuse reflecting dome-shape made of PTFE, and a metal housing. For the test, the PMT was connected to its base and layers of reflector tape were wrapped around the PMT/base assembly until it just fit into the inner diameter of the Li-glass tube with only the photocathode and the wiring extending from the reflector tape on opposite sides. The Lithium-glass tube was wrapped in reflector tape so that it just fit inside the metal housing. A cylindrical piece of PTFE was machined to have a concavity (cup-shape) on one end and the whole piece fitting on the end of the Lithium-glass tube with the concavity facing towards the opening in the Lithium-glass tube. The end of the Lithium-glass tube opposite the dome was also reflectorized with a combination of compressed PTFE powder and PTFE tape. As a result, all of the Lithium-glass tube was covered with reflector material except the ring-shaped end facing the reflector dome. (The functioning of the assembly can be understood by considering that it represents an optical integrating sphere with two ports, one for the PMT photocathode (about 8 mm diameter, corresponding to only 12% of the area required by conventional coupling) and one for the ring-shaped end of the Lithium glass scintillator.) The wrapped PMT/base assembly was slid into the Lithium-glass tube and the glass/PMT/base assembly was capped with the reflector dome and slid into the metal housing. The open end of the tube with the PMT signal and high voltage wires extending from it was sealed with black tape to prevent stray light from entering the device.

Figure 7:
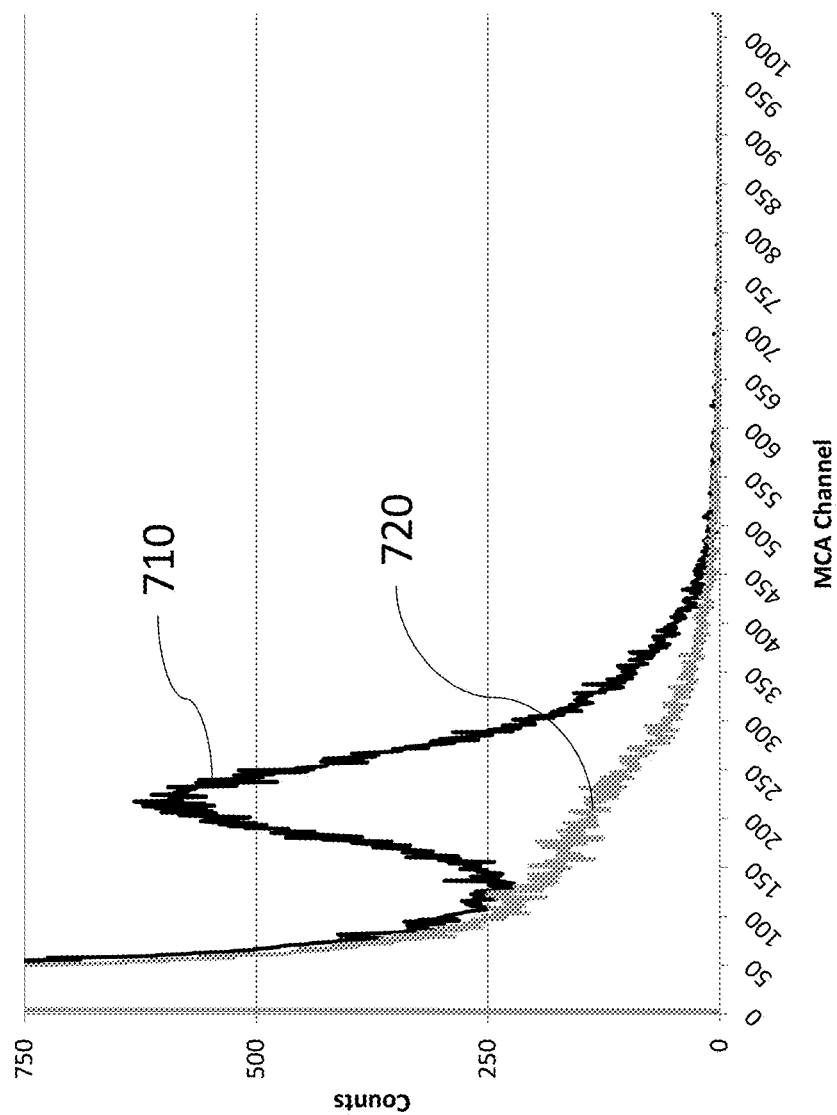
FIG. 7 presents example pulse height spectra measured by one embodiment of the present disclosure.

The assembly was connected to standard nuclear electronics for amplification and shaping of the signal and for acquiring a pulse height spectrum. The device was exposed to a mix or radiation coming from an Americium-Beryllium (AmBe) source in a water tank. The radiation had been shown in separate experiments to consist primarily of thermal neutrons with a background of fast neutrons and gamma rays up to several MeV energy (mostly characteristic gamma radiation of 2.22 MeV from the H+n reaction to deuterium and of 4.44 MeV from the $^9$Be+α reaction into $^{12}$C+n, and the down-scattered contributions of these). Pulse height spectra of this detector are shown in FIG. 7. Two consecutive experimental runs were performed. In the first run, the detector was directly exposed to the radiation of the water-moderated AmBe source (see curve 710 in FIG. 7). In the second run, a layer of Boron-10 enriched rubber was placed between the radiation source and the detector effectively filtering out at least 90% of the thermal neutrons (see curve 720 in FIG. 7). The difference between the two curves clearly shows a peak which is due to the thermal (and epithermal) neutrons. The count rate in the peak is in line with expectations from the known thermal (and epithermal) neutron flux near the moderator and the cross section area of the detector. To persons skilled in the art the shape of the peak will be recognized as typical for Lithium-glass spectra. The width of the peak can be further improved by, for example, improving the reflector design or improving the light transmission towards the PMT faceplate. To improve light transmission, one could use a medium for the scintillator-to-PMT coupling with higher refractive index such as a coupling pad made of silica.

To the extent used in the description and claims, phrases in the form of "at least one of [a] and [b]" should be construed as being disjunctive, i.e., encompassing arrangements that include [a] but not [b], arrangements that include [b] but not [a], and arrangements that include [a] and [b].

Although several example embodiments have been described in detail above, those skilled in the art will readily appreciate that many modifications are possible in the example embodiments without materially departing from the scope of this disclosure. Moreover the features described herein may be provided in any combination. Accordingly, all such modifications are intended to be included within the scope of this disclosure.

What is claimed is:

1. A device comprising:
a scintillator having an inner surface and an outer surface;
a photon detector at least partially enclosed by the inner surface of the scintillator; and
at least one reflector extending inside said inner surface of the scintillator and extending outside said outer surface of said scintillator thereby at least partially enclosing the scintillator and configured to direct photons emitted by the scintillator to the photon detector.

2. The device of claim 1, wherein at least one reflector encloses at least 75% of the scintillator.

3. The device of claim 1, wherein the scintillator material is in a solid phase.

4. The device of claim 3, wherein the scintillator forms a substantially annular cylinder with an inner diameter and an outer diameter and the photon detector is substantially cylindrical with a diameter of at least 1% of the inner diameter of the cylindrical ring of the scintillator material.

5. The device of claim 1, further comprising a housing enclosing the scintillator, the photon detector, and the at least one reflector.

6. The device of claim 1, wherein the photon detector is a photomultiplier tube; the photomultiplier tube comprising:
- a faceplate;
- a photocathode deposited on the faceplate; and
- an electron multiplier stage.

7. The device of claim 6, wherein the photomultiplier tube is a proximity-focusing photomultiplier tube.

8. The device of claim 6, wherein the photomultiplier tube is an end-on photomultiplier tube.

9. The device of claim 6, wherein the photomultiplier tube is a side-on photomultiplier tube.

10. The device of claim 1, wherein the photon detector is a photomultiplier tube, the photomultiplier tube comprising:
- a photocathode deposited directly onto the scintillator; and
- an electron multiplier stage.

11. The device of claim 1 further comprising:
- an optical coupling between the scintillator and the photon detector wherein the optical coupling comprises at least one of optical grease, an optical coupling pad, an air gap, or a light guide.

12. The device of claim 11, wherein the light guide has a refractive index matched to the scintillator and the faceplate of the photomultiplier tube.

13. The device of claim 1, wherein the photon detector overlaps at least 25% of the length of the scintillator.

14. The device of claim 1 wherein the scintillator comprises at least one material selected from the group consisting of: thallium-activated sodium iodide; cerium-activated yttrium aluminum perovskite (YAP); cerium-activated lithium glass; lithium calcium aluminum fluoride (LiCAF); plastic scintillators; composite scintillators; and liquid scintillators.

15. The device of claim 1, wherein the device is included in a handheld apparatus.

16. A method of measuring radiation in an oil and gas well comprising:
- conveying at least one scintillation detection device according to claim 1 to at least one zone of interest in the oil and gas well, said at least one scintillation device having a photon detector, a scintillator, and at least one reflector, said photon detector at least partially enclosed by a scintillator, said scintillator having an inner surface and an outer surface, and said at least one reflector extending inside said inner surface of the scintillator and extending outside said outer surface of said scintillator thereby at least partially enclosing the scintillator and configured to direct photons emitted by the scintillator to the photon detector; and
- recording data from the at least one scintillation detection device as a function of location in the oil and gas well.

17. A device comprising:
- a scintillator;
- a photon detector at least partially enclosed by the scintillator;
- at least one reflector at least partially enclosing the scintillator and configured to direct photons emitted by the scintillator to the photon detector; and
- an integrating sphere having a concave surface oriented toward (a) the scintillator and (b) the photon detector.

18. A device comprising:
- a segmented scintillator;
- a plurality of photon detectors at least partially enclosed by the segmented scintillator; and
- at least one reflector at least partially enclosing the segmented scintillator and configured to direct photons emitted by the segmented scintillator to at least one of said plurality of photon detectors;

wherein for each segment of the segmented scintillator a photon detector of said plurality of photon detectors is configured to read out that segment, and at least one of said plurality of photon detectors is substantially enclosed within the space between scintillator segments.

19. An oilfield wellbore device comprising:
- an oilfield string;
- at least one scintillation detection device on the oilfield string, the scintillation detection device comprising:
  - a scintillator having an inner surface and an outer surface,
  - a photon detector at least partially enclosed by the inner surface of the scintillator, and
  - at least one reflector extending inside said inner surface of the scintillator and extending outside said outer surface of said scintillator thereby at least partially enclosing the scintillator and configured to direct photons emitted by the scintillator to the photon detector; and
- a pressure housing enclosing the at least one scintillation detection device.

20. The oilfield wellbore device of claim 19, further comprising:
- a source of radiation enclosed in the pressure housing; and
- at least one radiation shielding disposed between the source of radiation and at least one of the at least one scintillation detection device.

* * * * *